Aug. 2, 1932. H. R. BRAND 1,869,541
FOOD PREPARING MACHINE
Filed June 27, 1929 2 Sheets-Sheet 1

INVENTOR
H.R.Brand
BY
ATTORNEY

Aug. 2, 1932.  H. R. BRAND  1,869,541
FOOD PREPARING MACHINE
Filed June 27, 1929  2 Sheets-Sheet 2
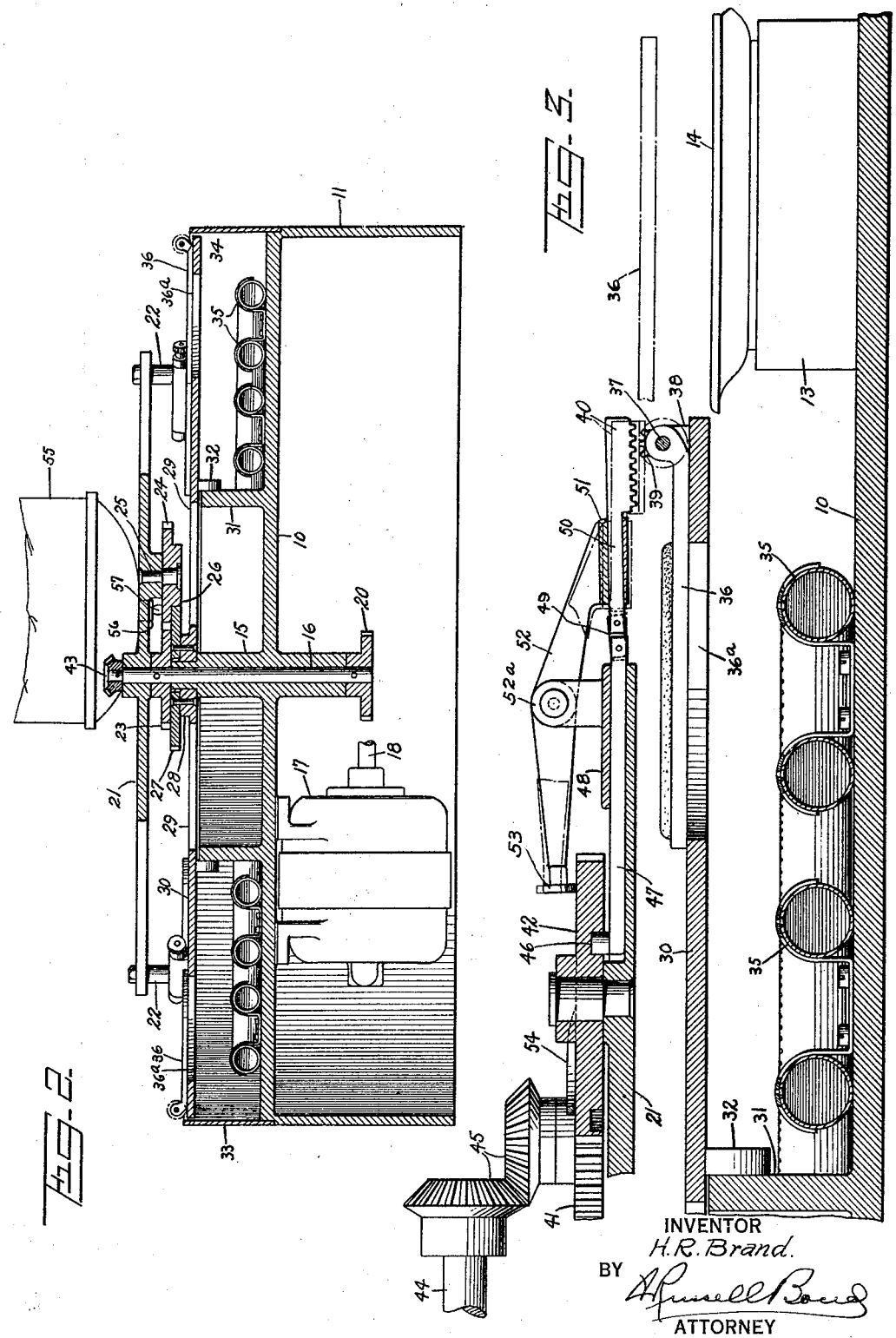
INVENTOR
H. R. Brand.
BY
ATTORNEY Patented Aug. 2, 1932

1,869,541

UNITED STATES PATENT OFFICE

HARRY RUSSELL BRAND, OF NEW YORK, N. Y.

FOOD PREPARING MACHINE

Application filed June 27, 1929. Serial No. 373,969.

My invention relates to food cookers and has for an object to provide an automatic machine which will cook food first on one side and then on the other.

My invention is particularly adapted for baking griddle cakes but may also be applied to the cooking of other foods.

The present invention is a variant of those disclosed in my copending applications, Serial No. 268,659, filed April 9, 1928, and Serial No. 373,968 filed June 27, 1929 respectively. In the former of said copending applications, I show a single rotary griddle on which a plurality of griddle cakes, or the like, may be baked as they are carried by the griddle from a batter depositing point to a delivery point, means being provided for turning the cakes successively intermediate said points. In the latter of said copening applications, I show a pair of rotary griddles, one of which bakes a plurality of cakes on one side and the other bakes the cakes on the reverse side, while a peel picks up the cakes successively from the first griddle and deposits them in inverted position on the second griddle.

An object of the present invention is to provide a more compact construction and one which will occupy less floor space for the same capacity than either of those disclosed in said copending applications.

Another object is to provide a simple mechanism for turning a cake over, after one side has been baked.

A more specific object of the present invention is to provide a griddle which is so mounted that it may be turned over to discharge and simultaneously invert a cake baked thereon.

Another object is to provide a pair of hinged griddles, each adapted to bake one cake at a time, the griddles being so mounted and relatively positioned that after one has baked one side of the cake, it may be turned over to deposit the cake in reverse position on the other griddle, and after the reverse side of the cake has been baked on said other griddle, thet latter may be turned over to deposit the cake upon a plate or other suitable receptacle.

Another object is to provide a plurality of individual griddles arranged in two traveling rows, the first row traveling under a batter deposit point, whence portions of batter may be deposited on successive griddles of the row, means being provided for successively inverting the griddles of the first row, after they have carried the cakes a predetermined distance, whereby the half-baked cakes will be dropped, raw side down, on griddles of the second row. The latter griddles in turn are successively inverted after traveling a predetermined distance to discharge the cakes successively at a delivery point.

Other objects of the invention will appear in the following description of a preferred embodiment, and thereafter the novelty and scope of the invention will be pointed out in the claims.

In the accompanying drawings;

Fig. 2 is a view in section taken on the line 2—2 of Fig. 1; and

Fig. 3 is an enlarged sectional view of a portion of the machine, the section being taken substantially on the line 3—3 of Fig. 1.

Figure 1:
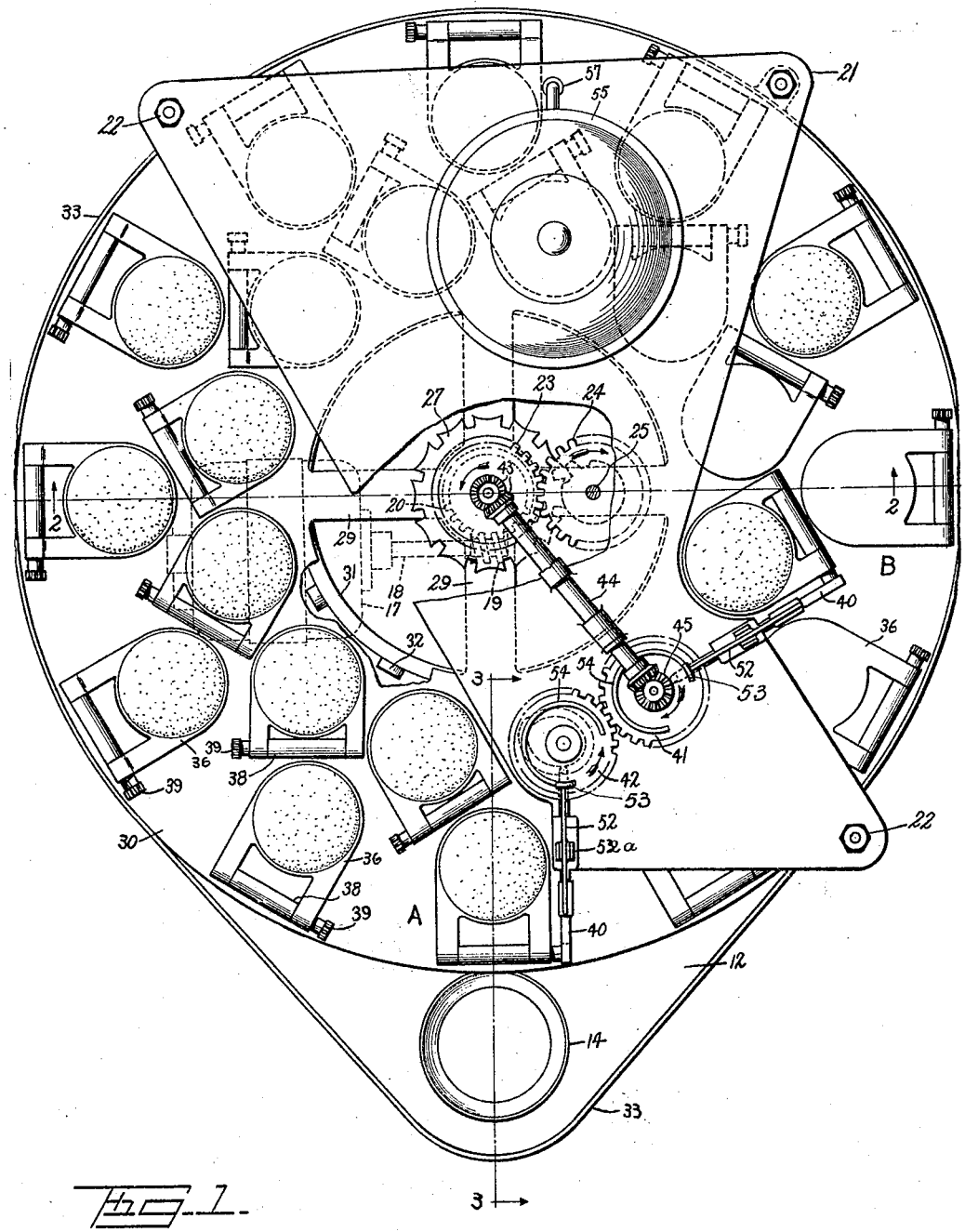
Figure 1 is a plan view of the griddle cake baking machine, a portion thereof being broken away to reveal certain details.

The body of my machine comprises a bed plate 10 supported on a down-turned marginal flange 11. The bed plate is substantially circular, but has an extension 12 at one side which carries a support 13 for a plate, or other suitable receptacle 14, as best shown in Fig. 3. At the center of the bed plate there is a bearing 15 for a vertical shaft 16. This shaft is driven by a motor 17 secured to the underside of the bed plate 10. The rotor shaft 18 of the motor, has a worm 19 fixed thereon, which engages a worm wheel 20 fixed upon the shaft 16. The upper end of the shaft 16 passes through and has a bearing in a plate 21 which is supported upon posts 22. The latter rise from the flange 11 but are offset so as to clear certain parts of the machine.

Fixed upon the shaft 16 immediately below the plate 21 is a gear 23 which meshes with a gear 24 journaled upon a stud 25 depending from the plate 21. The gear 24 is integrally formed with a single-toothed Geneva pinion which is adapted to drive a twelve-toothed Geneva gear 27. The latter is secured to a hub 28 which is journaled upon a reduced portion of the bearing 15. Radiating from the hub 28 are arms 29 which support an annular carrier plate 30. Mounted on the carrier plate are two concentric annular rows of griddles which will be described more in detail hereinafter.

As shown in Fig. 2, the carrier plate is spaced considerably above the bed plate 10. Rising from the bed plate is an annular flange 31 which extends close to the inner periphery of the carrier 30. Rollers 32 are mounted on the flange 31 and bear against the underside of the plate 30 to support the latter against tilting. Secured to the margin of the bed plate 10 is a band 33 which rises slightly above the carrier 30 and lies close to the outer edge of the same, except where the band departs therefrom to follow the contour of the extension 12. It will be observed that a substantially annular chamber 34 is formed between the bed plate and the carrier which chamber is peripherally defined by the flange 31 and the band 33. In this annular chamber are provided a number of annular gas or oil burners 35 which serve to heat the griddles 36 carried by the carrier plate 30.

As stated above, the griddles are arranged in two concentric rows and in the particular embodiment illustrated there are 12 griddles in the inner row and 12 griddles in the outer row. Each griddle 36 normally overlies an opening 36a in the carrier 30, through which opening heat from the burners 35 may pass directly into the griddle. Each griddle 36 is secured at one end to a hinge pin 37 which is journaled in a suitable bearing 38 carried by the plate 30. Each hinge pin 37 is provided at one end with a pinion 39 which is adapted to be engaged by a rack 40 whereby the pinion may be rotated to turn the griddle 36 over on its axis 37. There are two racks 40, one for turning the inner griddles and the other for turning the outer griddles.

As shown in Fig. 1, each griddle of the inner annular row is so disposed that when turned over it will overlie a griddle of the outer row. For purposes of convenience and, also, in order to make the machine as compact as possible, griddles of the inner row are staggered with respect to the griddles of the outer row and the hinge pins of the griddles in the inner row are correspondingly angled. The griddles of the outer row, however, are arranged to turn in planes radial to the carrier and consequently the hinge pins are normal to radial lines running from the shaft 16 through said griddles.

It will be understood from the description so far given, that the carrier plate moves with a step-by-step motion, there being 12 steps to each complete rotation thereof, and at each step the griddle of the outer row which has reached a delivery point A, is turned on its hinge pin to the position shown by broken lines in Fig. 3, so that the cake carried thereby will be deposited upon the plate 14. Similarly, as each griddle of the inner row reaches a point B, to the right of the delivery point, as shown in Fig. 1, it is turned over to deposit its cake upon a griddle of the outer row.

The rack which turns the griddles of the inner row is operated by a cam 41, while that which turns griddles of the outer row is operated by a cam 42. These two cams are formed with intermeshing gear teeth, as best shown in Fig. 1, so that they will rotate in opposite directions. Rotation of both of these cams is effected by the shaft 16 through the following mechanism: The upper end of the shaft 16 projects through the plate 21 and is operatively connected by a pair of miter gears 43 with a horizontal shaft 40. The latter is suitably journaled in bearings carried by the plate 21. The shaft 44, in turn, is operatively connected by miter gears 45 with the cam 41.

Each of the cams is formed on its under face with a cam groove adapted to be engaged by a roller 46 carried by a slide bar 47. Each bar 47 is adapted to operate a rack 40 and is mounted to slide in a suitable bearing 48 formed on the plate 21. A link 49 connects the outer end of the bar 47 with the stem 50 of the rack 40. The stem 50 slides in a suitable bearing 51 carried by one arm of a lever 52, the other arm of which is provided with a roller 53 adapted to engage the face of the cam 41 or 42 as the case may be. Each lever 52 is pivotally mounted in a bracket 52a carried by the plate 21. Each of the cams 41 and 42 is provided on its upper face with a rib 54 which is adapted to be engaged by the roller 53.

The timing of the cams with respect to the step-by-step motion of the carrier 30 is such that at each pause in the revolution of the griddles, the levers 52 will be tilted by engagement of the rollers 53 with the ribs 54, thus dropping the racks 40 into engagement with the pinions 39, and while the racks and pinions are in engagement the bars 47 will be reciprocated in their bearings 48 by engagement of the rollers 46 with the grooves in the cams. On the outward movement of the bars 47, an outer griddle 36 will be turned over to deposit a cake therefrom upon the plate 41 and simultaneously an inner griddle will be turned over to deposit a cake therefrom upon an outer griddle.

At one side of the machine and substantially opposite the extension 12, I provide a batter reservoir 55 which is supported upon the plate 21. This reservoir has a spout 56 which passes through the plate 21 directly over the line of travel of the inner row of griddles. By means of a handle 57, a valve (not shown) in the spout 56 may be operated to deposit portions of batter upon the griddles.

As shown in Fig. 1, a portion of batter deposited upon a griddle directly under the reservoir 55 will travel through nine steps before reaching the position B. At this point the griddle is turned over depositing the now half-baked cake upon a griddle of the outer row. After the griddle of the outer row has received the half-baked cake it advances through nine steps before reaching the position A, where it is turned over to deposit the now fully baked cake upon the plate 14. The timing of the machine and the heat of the burners is so relatively regulated that by the time each griddle of the inner row reaches the position B, shown in Fig. 1, the cake thereon will be thoroughly baked on one side and by the time each griddle of the outer row reaches the point A, the cake will be thoroughly baked on the other side.

It will be observed that the cake is turned over as it is deposited on the plate 14 so that the side last cooked will lie uppermost. This is desirable because said side is usually smoother and presents a better appearance than the side first baked.

It will be understood that the machine may deposit the cakes as baked upon a suitable conveyor instead of a fixed plate 14; also that plates 14 may be automatically brought into position to receive one or more cakes as the case may be. Such automatic mechanism has already been shown in my copending application Serial No. 268,659. Also the mechanism for operating the batter reservoir may be automatically instead of manually operated. Such automatic mechanism has also been shown in said copending application.

The outer griddles pass empty from the position A to the position B. This permits the operator to clean the griddles and grease them so that they will be ready to receive the cakes delivered from the inner row. The griddles of the inner row also have two idle positions between the point B and the point where the batter is deposited so that the griddles of the inner row may also be cleaned and properly greased before receiving their charge.

While I have described a specific embodiment of my invention, I wish it to be understood that this is illustrative and not limitative of my invention and that I reserve the liberty to make such changes in form, arrangement and construction of parts as fall within the spirit and scope of the following claims.

I claim:

1. In a machine of the character described, a plurality of griddles arranged in two rows, means for progressing each row, and means for inverting successive griddles of the first row to deposit food carried thereby upon the griddles of the second row.

2. In a machine of the character described, a plurality of griddles arranged in two rows, means for progressing each row, the griddles of the first row being invertible over the griddles of the second row, means at one point for inverting successive griddles of the first row to deposit food carried thereby upon the griddles of the second row, and means at another fixed point for successively inverting the griddles of the second row to discharge the food from the latter griddles.

3. In a machine of the character described, a plurality of griddles arranged in two endless rows, means for progressing each row, means at a fixed point for inverting the successive griddles of the first row to deposit food carried thereby upon the griddles of the second row, and means at another fixed point for successively inverting the griddles of the second row to discharge the food from the latter griddles.

4. In a machine of the character described, a plurality of griddles arranged in two concentric annular rows, means for progressing each row, means at a fixed point for inverting the successive griddles of the first row to deposit food carried thereby upon the griddles of the second row, and means at another fixed point for successively inverting the griddles of the second row to discharge the food from the latter griddles.

5. In a machine of the character described, a plurality of griddles arranged in two concentric annular rows, means for progressing each row step-by-step, means at a fixed point for inverting the successive griddles of the first row to deposit food carried thereby upon the griddles of the second row, and means at another fixed point for successively inverting the griddles of the second row to discharge the food from the latter griddles.

6. In a machine of the character described, a carrier, means for causing step-by-step rotation of the carrier, a plurality of griddles hinged on the carrier and arranged in two concentric annular rows, means for depositing batter on successive griddles of the first row, means at a predetermined position with respect to the batter depositing means for inverting the successive griddles of the first row to discharge batter therefrom upon the griddles of the second row, and means at a predetermined distance from said position for inverting the griddles of the second row to discharge food therefrom.

7. In a machine of the character described, a carrier, means for causing a step-by-step rotation of the carrier, a plurality of griddles hinged on the carrier and arranged in two concentric annular rows, means for depositing batter on successive griddles of the inner row, means at a predetermined position with respect to the batter depositing means for inverting the successive griddles of the inner row to discharge batter cakes therefrom upon the griddles of the outer row, and means at a predetermined distance from said position for inverting successive griddles of the outer row to discharge the batter cakes therefrom.

8. In a machine of the character described, a carrier, means for causing a step-by-step rotation of the carrier, a plurality of griddles hinged on the carrier and arranged in two concentric annular rows, means for depositing batter on successive griddles of the inner row, means at a predetermined position with respect to the batter depositing means for inverting the successive griddles of the inner row to discharge batter cakes therefrom upon the griddles of the outer row, means at a predetermined distance from said position for inverting successive griddles of the outer row to discharge the batter cakes therefrom, and a support for a receptacle to receive the cakes from the griddles of the outer row.

9. In a machine of the character described, a carrier, propelling means for causing step-by-step rotation of the carrier, a plurality of griddles hinged upon the carrier, each griddle having a pinion fixed thereon concentric with its hinge, a rack mounted at a relatively fixed point and adapted to engage the pinions successively at successive pauses in the rotation of the carrier, means for raising the rack clear of the pinions during movement of the carrier, and means for reciprocating the rack at each pause in the rotation of the carrier.

10. In a machine of the character described, a plurality of griddles, propelling means for progressing the griddles step-by-step through an orbit, and means for inverting each griddle as it pauses at a predetermined point in its orbit.

11. In a machine of the character described, a plurality of griddles, propelling means for progressing the griddles step-by-step through an orbit, and rack and pinion mechanism driven by the propelling means for inverting each griddle as it pauses at a predetermined point in its orbit.

12. In a machine of the character described, a plurality of griddles, each mounted to oscillate about an axis substantially parallel to the griddle, propelling means for progressing the griddles step-by-step through an orbit, and rack and pinion mechanism driven by the propelling means for oscillating each griddle about its axis of oscillation as it pauses at a predetermined point in its orbit.

In testimony whereof, I have signed this specification.

HARRY RUSSELL BRAND.